(12) United States Patent
Batra et al.

(10) Patent No.: US 8,526,604 B2
(45) Date of Patent: Sep. 3, 2013

(54) ENABLING WIRELESS CLIENTS FOR LOW-POWER OPERATION WHEN CLIENTS REQUIRE CONTROL MESSAGES FROM EXTERNAL SOURCES FOR COMMUNICATION

(75) Inventors: Vishal Batra, Bangalore (IN); Pankaj Vyas, Bangalore (IN); Sibasis Purohit, Bangalore (IN); Venu Madhava Rao Kosuri, Bangalore (IN); Indudharswamy G Hiremath, Bangalore (IN)

(73) Assignee: Gainspan Corporation, San Jose, CA (US)

( * ) Notice: Subject to any disclaimer, the term of this patent is extended or adjusted under 35 U.S.C. 154(b) by 49 days.

(21) Appl. No.: 13/241,206

(22) Filed: Sep. 23, 2011

(65) Prior Publication Data
US 2013/0077779 A1 Mar. 28, 2013

(51) Int. Cl.
*H04K 1/10* (2006.01)

(52) U.S. Cl.
USPC .............................................. 380/31; 726/20

(58) Field of Classification Search
USPC ......................................................... 380/31
See application file for complete search history.

(56) References Cited

U.S. PATENT DOCUMENTS

| | | | |
|---|---|---|---|
| 7,746,810 B2 * | 6/2010 | Sinha et al. ................... | 370/278 |
| 7,826,425 B2 | 11/2010 | Sekhar | |
| 2008/0089519 A1 | 4/2008 | Ekberg | |
| 2009/0290527 A1 * | 11/2009 | Guy et al. ..................... | 370/315 |
| 2009/0296618 A1 * | 12/2009 | Wang et al. .................... | 370/311 |
| 2010/0135256 A1 | 6/2010 | Lee et al. | |
| 2010/0195548 A1 | 8/2010 | Navda et al. | |
| 2011/0058672 A1 * | 3/2011 | Sannino et al. ............... | 380/255 |

OTHER PUBLICATIONS

Laura Marie Feeney; Investigating the Energy Consumption of a Wireless Network Interface in an Ad Hoc Networking Environment; Year: 2001; IEEE; pp. 1-10.*
"Unsynchronized Energy-Efficient Medium Access Control and Routing in Wireless Sensor Networks",http://citeseerx.ist.psu.edu/viewdoc/download?doi=10.1.1.92.6483&rep=rep1&type=pdf, Year 2007, pp. 1-119.
Ashima Gupta and Prasant Mohapatra, "Power Consumption and Conservation in WiFi Based Phones: A Measurement-Based Study", Downloaded Circa May 31, 2011, pp. 1-10.
Benny Pinkas, "Efficient State Updates for Key Management", Downloaded Circa May 31, 2011, pp. 1-16.

(Continued)

*Primary Examiner* — Mohammad W Reza
*Assistant Examiner* — Monjour Rahim
(74) *Attorney, Agent, or Firm* — Narendra Reddy Thappeta

(57) ABSTRACT

A wireless station (A) is operated in a power-save mode, in which the station is alternately in power-ON and power-OFF states to reduce power consumption. Wireless station (A) computes at least some future time instances at which another wireless station (B) is expected to start transmitting control messages. Wireless station (A) is ensured to be in the power-ON state in corresponding time intervals encompassing durations of at least some of such future transmissions of control messages by wireless station (B), and is thereby enabled to receive the control messages. In an embodiment, the control messages correspond to group key message updates in which values of a decryption key are transmitted, wireless station (A) being a wireless client, wireless station (B) being an access point, with wireless stations (A) and (B) operating in a wireless network consistent with IEEE 802.11 specifications, and communication between wireless stations (A) and (B) being encrypted.

18 Claims, 6 Drawing Sheets

(56) References Cited

OTHER PUBLICATIONS

Marc Emmelmann, Sven Wietholter, and Hyung-Taek Lim, "Influence of Network Load on the Performance of Opportunistic Scanning", Downloaded Circa May 31, 2011, pp. 1-9.

Xavier Perez-Costa, Daniel Camps-Mur and Albert Vidal, "On the Distributed Power Saving Mechanisms of Wireless LANs 802.11e U-APSD vs 802.11 Power Save Mode", Dated Nov. 1, 2006, pp. 1-17.

Adrian Perrig, Dawn Song and J. D. Tygar, "ELK, a New Protocol for Efficient Large-Group Key Distribution", Downloaded Circa May 31, 2011, pp. 1-16.

"WMM™ Power Save for Mobile and Portable Wi-Fi® Certified Devices", Wi-Fi Alliance, Dated Dec. 2005, pp. 1-16.

"Wireless Network Access Point User Manual", Belkin.com, © year 2002, pp. 1-37.

* cited by examiner

ENABLING WIRELESS CLIENTS FOR LOW-POWER OPERATION WHEN CLIENTS REQUIRE CONTROL MESSAGES FROM EXTERNAL SOURCES FOR COMMUNICATION

BACKGROUND OF THE INVENTION

1. Technical Field

Embodiments of the present disclosure relate generally to wireless communications, and more specifically to techniques for enabling wireless clients for low-power operation when the clients require control messages from external sources for communication.

2. Related Art

A wireless network generally includes two or more devices ("wireless devices") that communicate with each other over a wireless medium. A wireless local area network (WLAN) designed to operate according to IEEE 802.11 standard(s) is an example of a wireless network. Wireless devices (also termed wireless clients) of a wireless network may communicate with a wired network via an access point (AP). Wireless clients may be either mobile devices or be fixed (non-mobile). A wireless client (client) may transmit data to and receive data from other clients in the wireless network either directly or via the AP. A client may also transmit to and receive data from wireless devices outside the wireless network via the AP.

In addition to data (representing information of interest such as text files, images etc), a client may also receive other types of messages, such as control messages, from (or via) the AP of the wireless network. Control messages generally refer to messages that specify operational parameters that enable clients (and the AP, if present) to operate correctly or in a desired manner in the wireless network. Control messages may often be updated (and transmitted to the wireless clients) by the AP at appropriate time instances. Clients typically need to receive the updated control messages and perform corresponding actions specified or required by the control messages to ensure proper operation.

Clients are often operated in 'power-save' modes that permit reduction in power consumption. According to one example technique, a client may be powered-ON (and thus fully operational) only intermittently or periodically, while remaining in a power-OFF state in the remaining durations. One problem faced while operating in such power-save modes is that a client may be in a power-OFF state when control messages are transmitted by the AP. Not receiving one or more control messages may potentially disrupt normal operation (in powered-ON mode) of the client in the wireless network. One known technique used to address the problem noted above is to reduce the power-OFF durations of the client. Such an approach, however, may translate to a reduction in power savings in the client, and therefore may not desirable.

Several embodiments of the present disclosure are directed to enabling wireless clients for low-power operation when clients require control messages from external sources for communication.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

According to an aspect of the present invention, a wireless station (A) is operated in a power-save mode, in which the station is alternately in power-ON and power-OFF states to reduce power consumption. Wireless station (A) computes at least some future time instances at which another wireless station (B) is expected to start transmitting control messages. Wireless station (A) is ensured to be in the power-ON state in corresponding time intervals encompassing durations of at least some of such future transmissions of control messages by wireless station (B), and is thereby enabled to receive the control messages.

In an embodiment, the control messages correspond to group key message updates in which values of a decryption key are transmitted. In the embodiment, wireless station (A) is a wireless client, and wireless station (B) is an access point. Wireless stations (A) and (B) operate in a wireless network consistent with IEEE 802.11 specifications, and communication between wireless stations (A) and (B) is encrypted.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
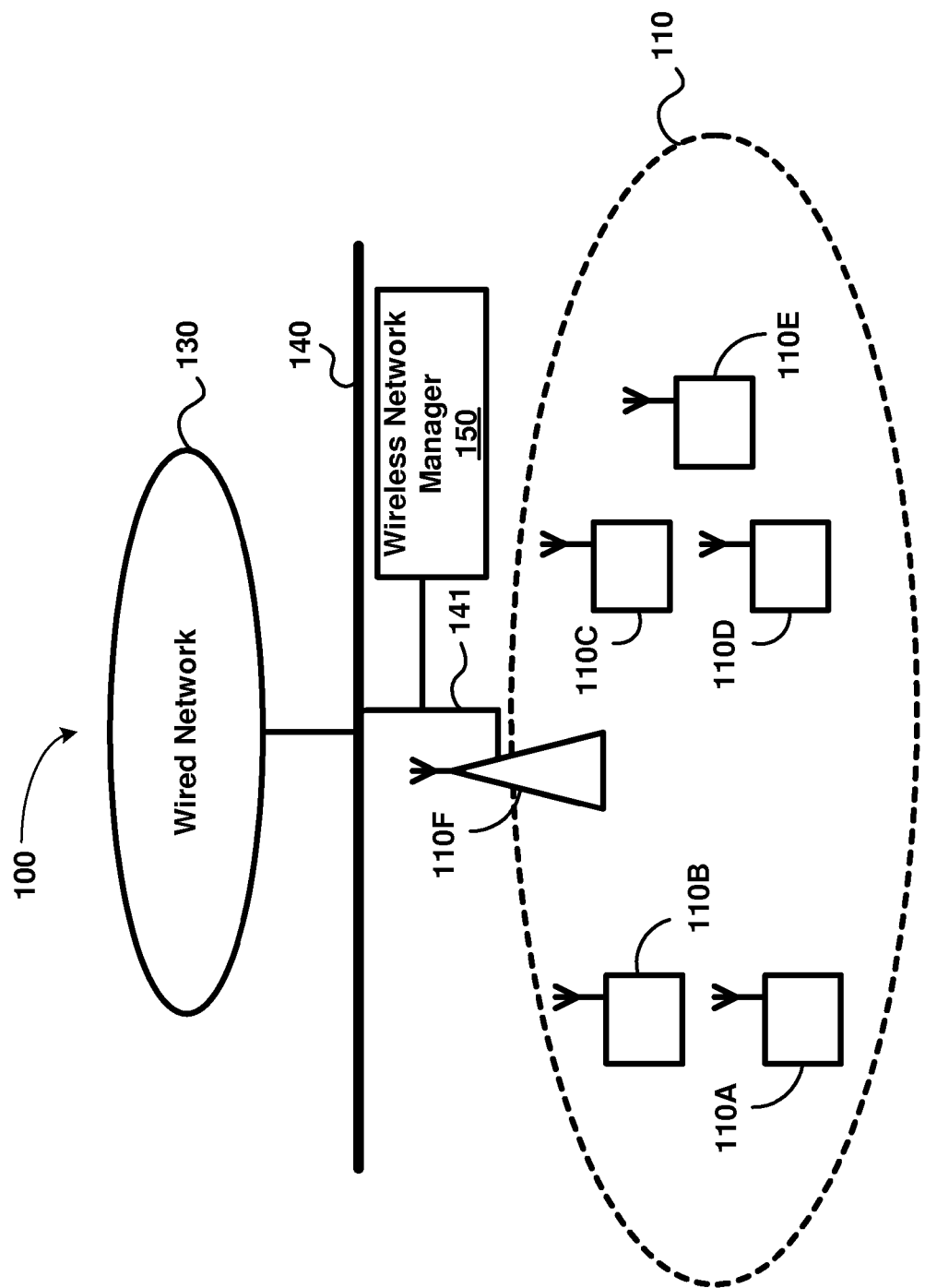
FIG. 1 is a block diagram of an example environment in which several features of the present invention can be implemented.

FIG. 1 is a block diagram illustrating an example environment in which several features of the present invention can be implemented. The example environment is shown containing only representative systems for illustration. However, real-world environments may contain many more systems/components as will be apparent to one skilled in the relevant arts. Further, in the description below, the components and the environment are described as operating consistent with IEEE 802.11 standard(s), merely for illustration. Implementations in other environments are also contemplated to be within the scope and spirit of various aspects of the present invention.

System 100 is shown containing client devices (clients) 110A-110E, access point (AP) 110F, wired network 130, wired network backbone 140 and wireless network manager 150. Block 110 represents a basic service set (BSS) consistent with the 802.11 standard. Other environments may include more than one BSS, with the BSSs being interconnected to form an extended service set (ESS) consistent with IEEE 802.11 standards. While the description below is provided with respect to an infrastructure BSS, several embodiments of the present disclosure can be implemented in an independent BSS (IBSS) as well. As is well-known in the relevant arts, an IBSS is an ad-hoc network and does not contain access points. The term "wireless station" is used herein to refer to both a wireless client as well as an access point.

AP 110F is connected by a wired medium (141) to wired network backbone 140 and thus to wired network 130. Each of clients 110A-110E may communicate with AP 110F (as well as with each other) wirelessly according to any of the family of IEEE 802.11 protocols (including as specified in IEEE 802.11a, 802.11b, 802.11g and 802.11n) and thereby with wired network 130. Wired network 130 may represent the internet, also known as the World Wide Web. One or more of clients 110A-110E may correspond, for example, to a laptop computer, smart phone, or a wireless sensor.

Wireless network manager 150 transmits configuration and control messages to AP 110F. Some of the configuration and control messages may be meant for clients 110A-110E. Accordingly, AP 110F forwards the corresponding configuration and control messages meant for the clients, either as unicast messages (directed to a specific one of clients 110A-110E) or as broadcast messages. Although shown separate from AP 110F, the features of wireless network manager may instead be integrated within AP 110F in some embodiments.

Wireless network manager 150 may additionally be designed to operate as a controller of BSS 110, and issue network commands to and receive data from one or more of clients 110A-110E, and may thus operate to provide desired features such as building or plant automation, based on the specific environment in which the components of FIG. 1 are deployed. The data received from clients 110A-110E may represent measured values of desired parameters such as temperature, pressure, humidity, etc. In other embodiments, clients 110A-110E may be deployed for purposes other than for providing features such as plant automation. For example, one or more of clients may represent a computing device such as a laptop, and may transfer data with other devices in BSS 110 or wired network 130 based on the requirements of the user of the laptop.

One or more of clients 110A-110E may be designed to operate in a 'power-save' mode. For example, in the context of IEEE 802.11 operation, a client (assumed to be client 110A herein for simplicity) may operate in the standard Power Save Poll Mode (PSPM, or power-save mode, in general). Upon joining BSS 110, client 110A communicates to AP 110F that it (client 110A) is to operate in PSPM. In PSPM, client 110A periodically "wakes up" (i.e., powers-ON for full functionality) from a power-OFF state to transmit data to, or receive data from, AP 110F or the other clients of BSS 110.

Figure 2:
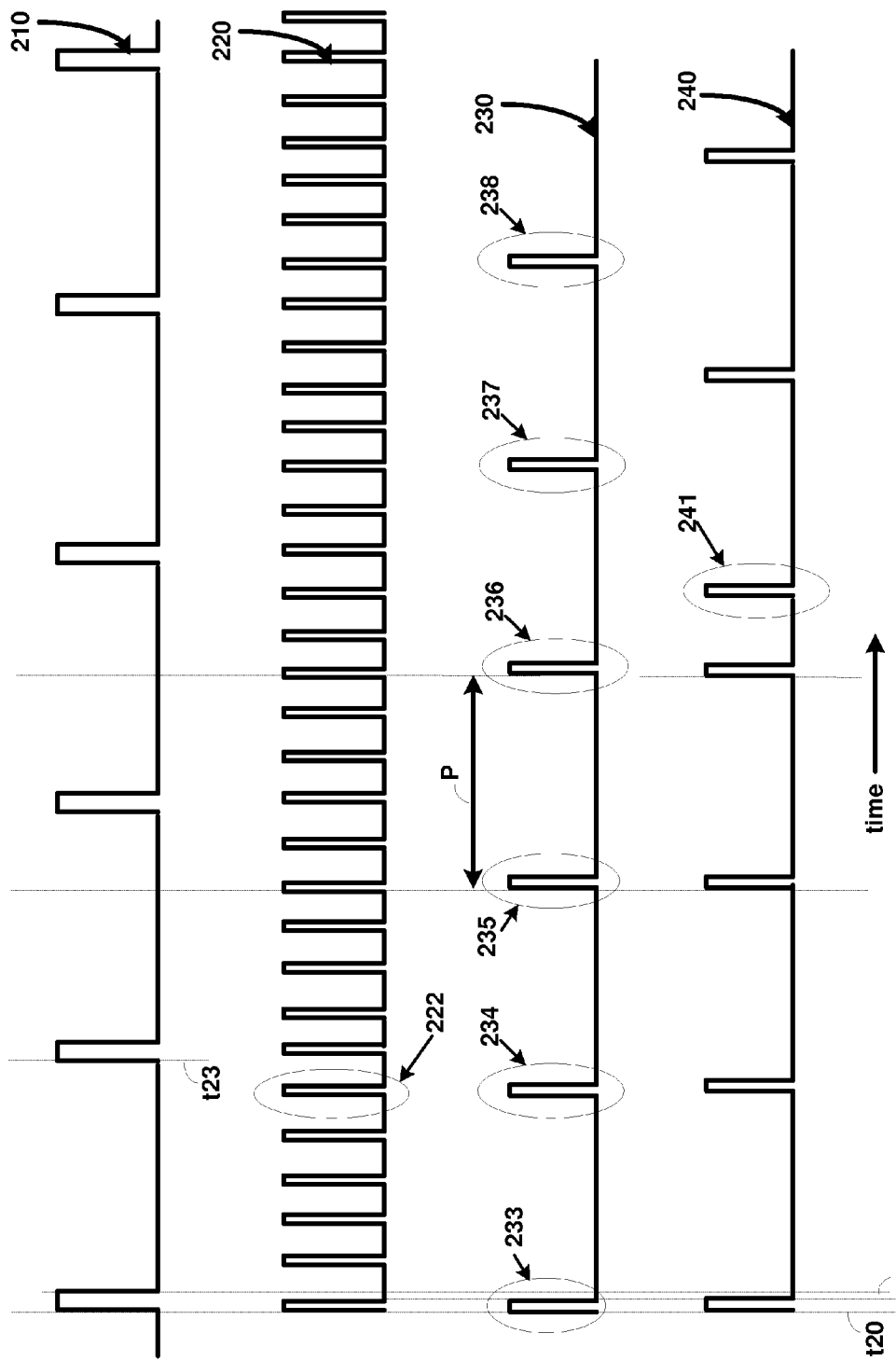
FIG. 2 is a diagram illustrating example waveforms representing transmission of beacon frames and control messages by a wireless station, and power-ON/power-OFF sequences of another wireless station, in an embodiment.

Waveform 210 of FIG. 2 is an example waveform illustrating periodic power-ON and power-OFF sequences of client 110A in PSPM. Waveform 220 represents an example of periodic beacon frames transmitted by AP 110F. Waveform 230 represents an example sequence of periodic control messages transmitted by AP 110F. Waveform 240 represents an example of transmission of an asynchronous control message in a sequence of otherwise periodic control messages transmitted by AP 110F. Interval t20-t23 represents the interval between successive power-ON (wake) states, and is termed the 'listen interval'. Interval t20-t22 is the duration for which client 110A is in the power-ON state in each listen interval, and may be different for different listen intervals depending on the volume of data to be transmitted or received or other considerations. Upon joining BSS 110, client 110A communicates the listen interval to AP 110F. The listen interval is typically a multiple of a beacon frame interval/period.

Beacon frames refer to a type of management frame specified by the IEEE 802.11 standard, and are periodically transmitted by AP 110F. Beacon frames generally specify information about the corresponding wireless network (BSS 110 in FIG. 1). Beacon frames are transmitted periodically to announce the presence of a Wireless LAN network. Beacon frames are transmitted by the Access Point (AP) in an infrastructure BSS. In IBSS networks, beacon frame generation is distributed among the stations in the IBSS. Some of the information contained in beacon frames includes timestamp (for synchronization of time among all the stations in a BSS), beacon frame interval (time interval between beacon frames), capability information (specifying capabilities of the wireless network), supported data rates, etc.

Client 110A synchronizes its local clock with respect to the clock of the AP, based on the time stamp contained in a beacon frame. Client 110A, when operating in power-save mode, sets its listen interval equal to some multiple (K) of the beacon frame interval, and aligns its power-ON durations (such as in interval t20-t22 in FIG. 2) with the beacon frames.

In FIG. 2, waveform 220 represents an example of periodic beacon frames transmitted by AP 110F. Specifically, durations such as t20-t21 (in general, logic-high durations of waveform 220) represent beacon frame transmissions. In FIG. 2, the listen interval of client 110A is shown as equaling six beacon frame intervals of beacon frames transmitted by AP 110F. However, the specific listen interval, and thus the multiple (K) may be set based on specific considerations. For example, if very low-power operation is required for client 110A, and data exchange between client 110A and other stations in BSS 110 are relatively infrequent, a large value (e.g., 100) may be set for K.

Control messages transmitted by AP 110F are typically periodic, the period equaling some multiple (M) of the beacon interval. Control messages are synchronized with beacon messages. Waveform 230 in FIG. 2 represents an example of periodic control messages transmitted by AP 110F. Specifically, durations such as t20-t21 (in general, logic high durations of waveform 230) represent control message transmissions. The logic-high durations of respective waveforms 210, 220 and 230 are merely meant for illustration. The specific lengths of each of the corresponding transmissions may be system, network or device-specific.

In FIG. 2, the multiple M equals five. In general, however, other values of M may be used. Control messages transmitted by AP 110F may be generated by wireless network manager 150, and provided to AP 110F via path 141 (FIG. 1). In FIG. 2, waveform 230 is shown separate from waveform 220 merely for clarity. In practice, control messages are advertised within beacon frames transmitted by AP 110F. Multicast control messages are transmitted immediately after they are advertised in the beacon frame. AP 110F intimates to a corresponding client the presence of unicast control messages, and the corresponding unicast control messages are fetched by the client.

It may be observed from FIG. 2 that, excepting for the first control message transmission (233), client 110A is in a power-OFF state during transmissions (or intimation of presence by AP 110F) of the other control messages. In general the periodicities and/or the alignment of the listen intervals of client 110A and transmissions (or intimation of presence by AP 110F) of control messages may be such that client 110A may not be in a power-ON state to receive one or more transmitted control messages. As a result, the proper operation of client 110A, and potentially of BSS 110, may not be ensured. In particular, the IEEE 802.11 standard (or the corresponding amendments to the standard) stipulates that some control messages (e.g., Group Key Update messages) be acknowledged by the corresponding client(s). Non-acknowledgement of a control message may potentially result in client 110A being dissociated from BSS 110, thereby requiring re-establishment of the association with BSS 110, which in turn may be wasteful of power in client 110A.

It is noted here that AP 110F may store (i.e., buffer) control messages and transmit such buffered control messages to the corresponding destination client when such client sends the fetch request (PS-POLL frame in IEEE 802.11) to AP 110F. In the context of IEEE 802.11, AP 110F informs client 110A about such buffered control messages (as well as application-level data, if any are undelivered) using a traffic indication message (TIM) within a beacon frame. The broadcast or multicast messages for client 110A are indicated in the beacon every DTIM (Delivery Traffic Indication Message) interval. After a DTIM interval, access point 110F transmits the buffered control messages (and data, if any are present) to client 110A.

In practice, the storage capacity in AP 110F may be limited, and AP 110F may not be able to store more than a certain number of such un-acknowledged control messages and data. As a result, at least in some implementations, one or more control messages may still never be received by client 110A.

When BSS 110 is operated in a "secure mode", data and messages exchanged between the wireless stations of BSS 110 are encrypted. A decryption key (or decryption keys) required for decrypting the encrypted messages may be generated by wireless network manager 150, and provided to AP 110F. AP 110F may then unicast the decryption key(s) to each of clients 110A-110E.

Examples of such secure-mode operation are Wi-Fi Protected Access (WPA Personal/Enterprise) and Wi-Fi Protected Access II (WPA2 Personal/Enterprise), which are security protocols developed by the WiFi Alliance, and as defined in the IEEE 802.11i amendment to the IEEE 802.11 standard. Consistent with the WPA (Personal/Enterprise) and WPA2 (Personal/Enterprise) protocols, the decryption key is updated periodically. Typically, wireless network manager 150 periodically updates the value of the decryption key, and provides the updated values to AP 110F. AP 110F broadcasts the updated decryption key (termed the group key since the same decryption key is used by all clients in the BSS) at the corresponding time instances.

Thus, the logic-high durations of waveform 230 represent durations in which corresponding updated values of the decryption key(s) are available at AP 110F for transmission by AP 110F. Thus, for example, a first value of the decryption key is indicated as available in transmission marked 233 in FIG. 2, a next (updated) value of the decryption key is transmitted in transmission marked 234, and so on. Period (P) of the updates is marked in FIG. 2. It may be observed that client 110A is powered-OFF during transmissions marked 234, 235, 236, 237 and 238.

Non-receipt of the latest value of the decryption key implies that client 110A cannot decrypt messages received from AP 110F (or the other clients in BSS 110). Further, inability to decrypt messages received from AP 110F may result in non-acknowledgement by client 110A of such messages, thereby potentially resulting in client 110A being dissociated with BSS 110, as noted above.

It is also noted that, although typically the control messages (for example, the group-key updates) are sent periodically, certain asynchronous events may result in some control messages being generated and transmitted asynchronously (i.e., not in keeping with the update interval), as shown by waveform 240. As shown there, transmission shown numbered 241 occurs asynchronously, i.e., out of sequence with respect to the periodic transmissions that occurred previously in time. Subsequent transmissions may be periodic with the same period as before.

One technique to minimize the probability of missing receipt of transmitted control messages is to reduce the power-OFF durations (or equivalently the listen intervals) of client 110A. Doing so, however, may result in increased power consumption in client 110A, which may not be desirable. The manner in which the problems noted above are overcome in embodiments of the present disclosure is described in detail next.

3. Technique

Figure 3:
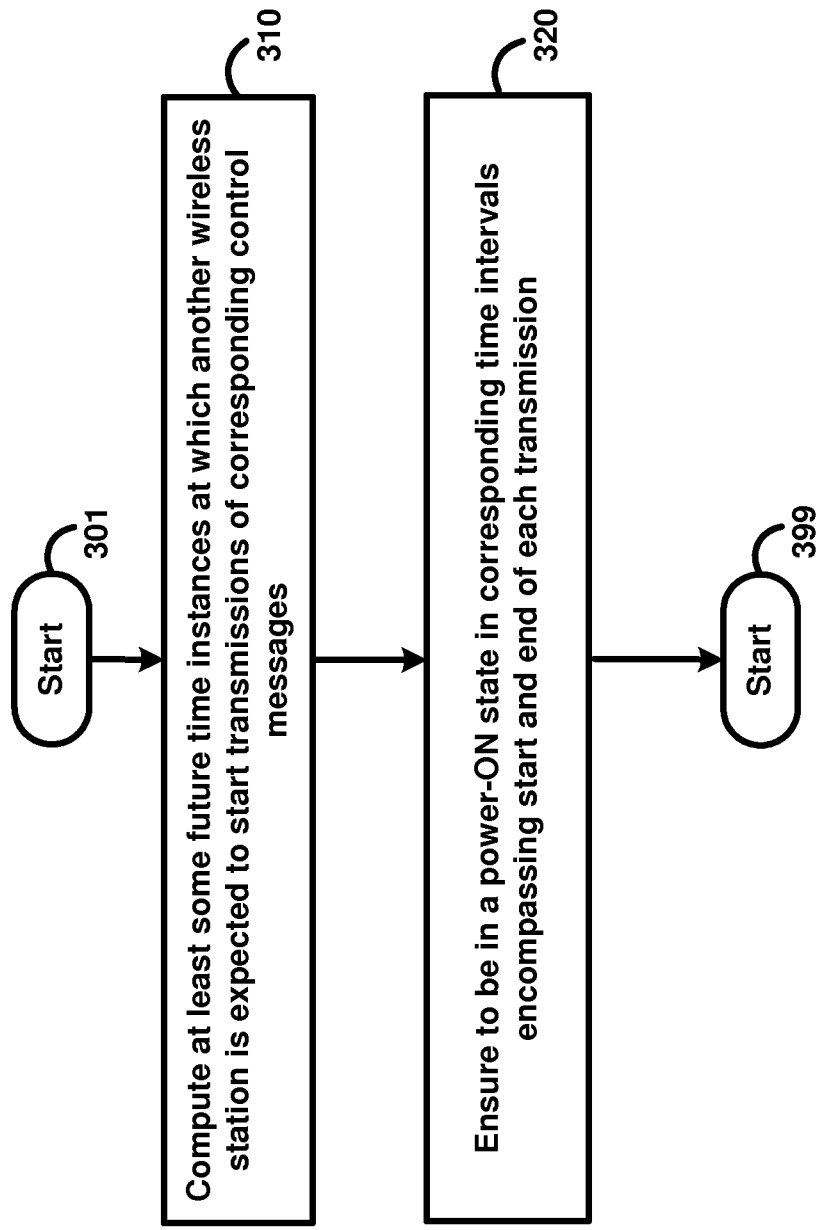
FIG. 3 is a flowchart illustrating the manner in which a wireless station, operating in a power-save mode, ensures receipt of control messages transmitted from another wireless station, in an embodiment.

FIG. 3 is a flowchart illustrating the manner in which a wireless station, operating in a power-save mode, ensures receipt of control messages transmitted from another wireless station, in an embodiment of the present invention. The flowchart is described with respect to the environment of FIG. 1, and in relation to client 110A in particular, merely for illustration. However, various features described herein can be implemented in other environments (for example, in ad-hoc networks not requiring an access point) and using other components, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, client 110A computes at least some future time instances at which another wireless station is expected to start transmissions of corresponding control messages. For example, in the environment of FIG. 1, client 110A may compute future time instances of transmissions of control messages by AP 110F. Future time instances refer to time instances later in time than the current time. Control then passes to step 320.

In step 320, client 110A ensures that it (client 110A) is in the power-ON state in corresponding time intervals encompassing start and end of each transmission of the corresponding control messages. As a result, client 110A is able to receive the transmitted control messages. Control then passes to step 399, in which the flowchart ends.

While the flowchart of FIG. 3 is noted as ending in step 399 (and after step 320), the operations of the flowchart may be performed multiple desired points in time based on requirements. For example, an asynchronous event may cause AP 110F to reset its group key message update starting point (base) and/or the group key update period. For example, the starting point of the 'new' group key message update period may be reset as indicated by transmission 241 of waveform 240 of FIG. 2. In such circumstances, steps 310 and 320 may be performed repeatedly.

The operation of steps 310 and 320 noted above are illustrated next with respect to example embodiments. In particular, the following description is provided in the context of receiving group key message updates. However, similar or corresponding techniques can be adopted in other contexts or types of control messages.

4. Embodiment

Figure 4:
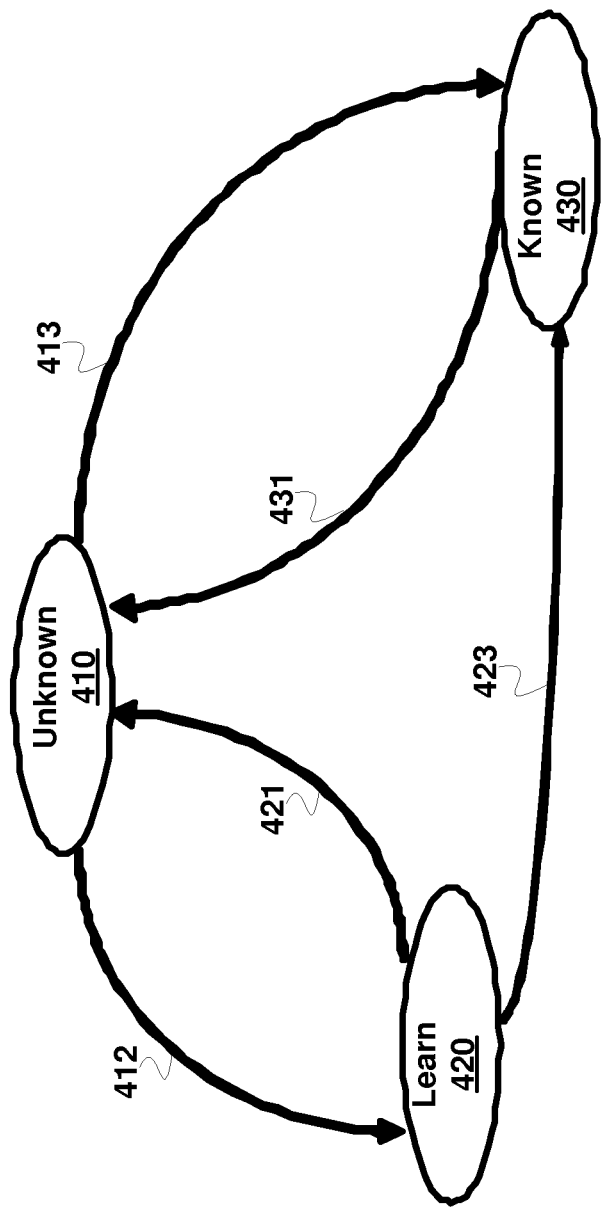
FIG. 4 is a state transition diagram of a wireless station operating in a power-save mode, in an embodiment.

In an embodiment, based on whether sufficient information regarding a reference point (base) and the period of group key update messages is known or not, client 110A operates in one of three states. FIG. 4 is a state transition diagram of client 110A, and shows the three states, namely "UNKNOWN" (410), "LEARN" (420) and "KNOWN" (430).

Immediately following association with BSS 110, and if the base of the group key update messages is not known to client 110A, client 110 enters the UNKNOWN state (410). In this state, period (P) may either be known or not known to client 110A. An example of when (P) is known a priori to client 110A is when the period (P) of the group key update messages is provided at the time of association of client 110A with BSS 110, or if (P) is hardcoded (or provisioned) in client 110A.

In state "UNKNOWN" (410), client 110A remains in a "radio-learn mode", i.e., client 110A is either continuously in the power-ON state or powers-ON sufficiently frequently such that one group key update message is received. When powering-ON frequently (rather than continuously be in the power-ON state), client 110A may power-ON once every 'R' beacon frame transmissions from AP 110F, with R being much smaller than the interval (B) for which control messages are buffered by AP 110F. Interval (B) may be stored in client 110A prior to deployment based on known parameters of BSS 110. In an embodiment, R equals thirty. However, in other embodiments other values for R may be used. For example, a value of R of one may be used, with client 110A waking up (i.e., powering-ON) for every beacon frame transmission. In yet another embodiment, R may be progressively reduced to the value one, based on the length of time spent in states "Unknown" or "Learn".

On receiving the group key update message for the first time, the 'base' of the periodic group key update messages is available to client 110A. Client 110A then changes to state "KNOWN" (430) if period (P) is already known, as indicated by arrow 413. If the period (P) is not yet known, client 110A transitions to state "LEARN" (420) as indicated by arrow 412.

In "LEARN" state 420, the base of the periodic series represented by the periodic updates of the group key messages is known, but he period (P) is not known. Client 110A continues in the "radio-learn" mode (noted above) till at least a desired number of following and successive group key update messages are received. Client 110A computes the difference in the time stamps of successive pairs of group key update messages received to obtain several estimates of the period (P). Client 110A then transitions to state "KNOWN". When the desired number of group key update message is X or more (wherein X may equal three), if at least a threshold number of estimates of (P) are all equal (within a tolerance range), client 110A transitions to state KNOWN, as indicated by arrow 423.

However, if different values for (P) are obtained for at least two of the threshold number of estimates, client 110A remains in state "LEARN" till period P is reliably determined (based on receipt of following successive group key update messages). When the desired number (X) is two, only a single computation of (P) is possible, and client 110A may directly transition to the KNOWN state. If client 110A is de-authenticated from the network (i.e., dissociated from BSS 110), client 110A transitions to state UNKNOWN. Such de-authentication may occur due to non-receipt of one or more group key update messages, and may occur, for example, due to a reset of the group key update periodic series, such as illustrated with respect to waveform 240 of FIG. 2.

In "KNOWN" state 430, both the base of the periodic series represented by the periodic updates of the group key messages a well as the period (P) is known to client 110A. In the "KNOWN" State, client 110A ensures that it is in a power-ON state for receiving each group key update message occurring at intervals of P. If client 110A is de-authenticated from the network (i.e., dissociated from BSS 110), client 110A transitions to state UNKNOWN. Such de-authentication may occur due to non-receipt of one or more group key update messages that may occur, for example, due to a reset of the group key update periodic series, such as illustrated with respect to waveform 240 of FIG. 2. Client 110A also transitions to state UNKNOWN if all applications executing in client 110A disconnect from the corresponding stations or nodes in BSS 110 or wired network 130, or if client 110A misses receiving a threshold number of group key update messages from the network. Client 110A may miss receiving one or more group key update messages if a reset of the group key update periodic series has occurred.

Figure 5:
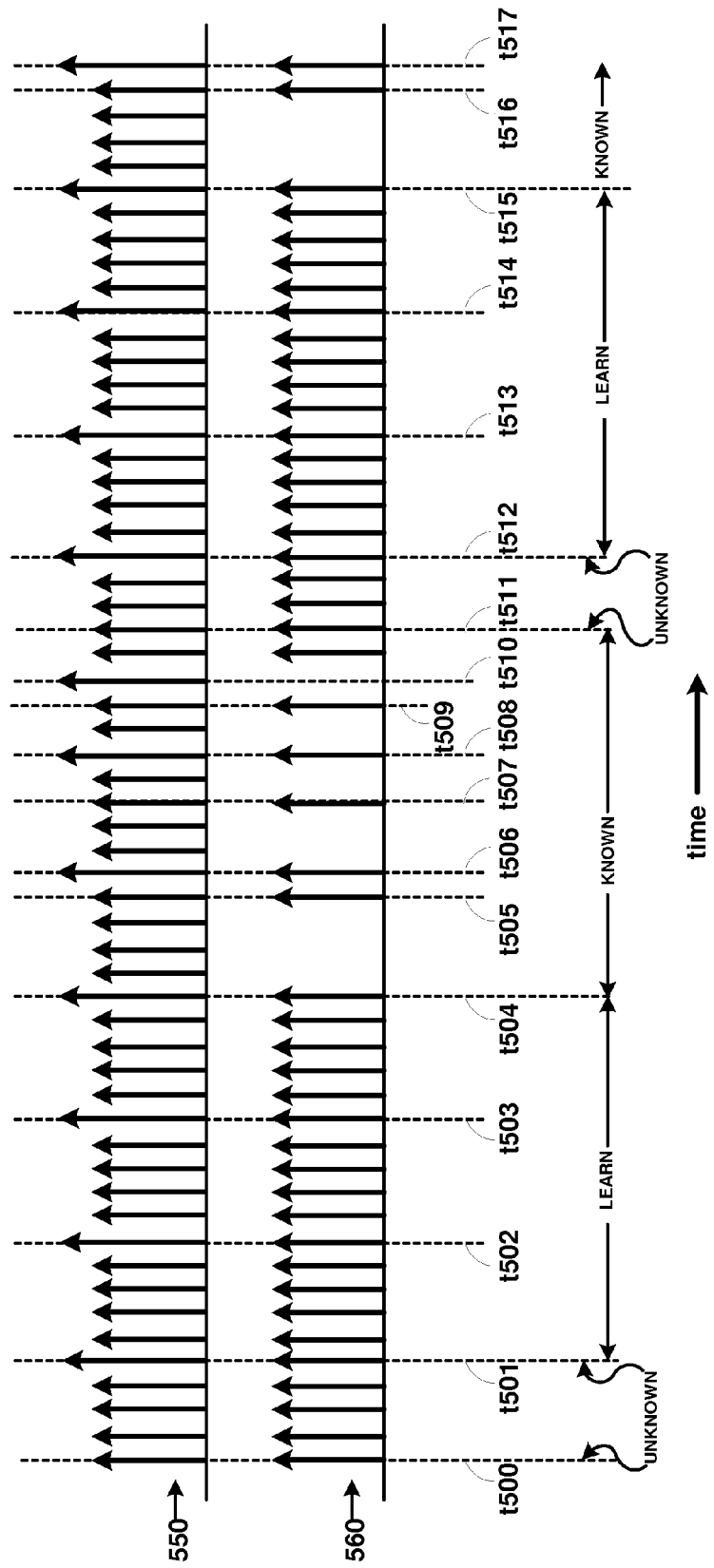
FIG. 5 is a diagram containing example waveforms used to illustrate the operation of a wireless station, in an embodiment.

FIG. 5 illustrates example waveforms showing the operation of client 110A in the three states noted above. The arrows in sequence (or waveform) 550 represent transmissions of beacon frames by AP 110F. Beacon frames that contain group key update messages (or control messages in general) are represented by taller arrows in waveform 550, examples being arrows at time instances t501 and t502. Arrows in waveform 560 represent wake-up (i.e., power-ON) durations of client 110A. Client 110A is in the power-OFF state in the time interval between any two successive arrows, which also represents the listen interval of client 110A. For simplicity, the transmission durations of AP 110F and power-ON durations of client 110A are shown as being infinitesimal (being the 'time interval' represented by an arrow itself). Actual transmission and power-ON durations have non-zero values. The specific values of listen intervals, group key update periods, etc., of FIG. 5 are provided merely to illustrate the manner in which client 110A operates to obtain at least some group key update messages, and real-world values for such parameters may be different from those shown in FIG. 5. The corresponding states of operation (UNKNOWN, LEARN and KNOWN) are also indicated in FIG. 5 for the example.

Client 110A is assumed to have associated with BSS 110 immediately prior to time instance t500. Corresponding to the description provided with respect to FIG. 5, client 110A enters the UNKNOWN state at (or immediately prior to) t500, and is in a radio-learn mode. In FIG. 5, listen intervals of client 110A in the UNKNOWN state are assumed to equal the period of beacon frame transmission from AP 110F. However, larger listen intervals or continuous listening (without power-OFF, i.e., maintaining client 110F in power-ON state) can instead be used.

At time instance t501, client 110F receives the first group key update message, thus obtaining the base (or reference point) of the periodic series represented by the group key update messages. Client 110A transitions to the LEARN state at (or immediately after) t501.

In the LEARN state, client 110A continues in the radio-learn mode, receiving the following three group key messages at t502, t503 and t504. Client 110A computes period (P) of the group key update messages, and transitions to the KNOWN state at or immediately after t504.

In the KNOWN state, client 110A increases the length of the listen interval to reduce power consumption. In the example of FIG. 5, the listen interval is shown as being increased to equal four beacon frame periods starting from t504. Hence, client 110A wakes-up at t505, t507 and t509. In addition, client 110A also wakes-up at time instances t506, t508 and t511 to receive group key message updates, based on the knowledge of the base and period (P) of the group key update messages, computed at or prior to t504. Time instances t506, t508 and t511 are examples of 'future time instances' with respect to t504 (or a time interval occurring slightly earlier than t504), when client 110A performs the corresponding computations noted above and 'decides' to wake up at the 'future time instances'. AP 110F broadcasts group key update messages at t506 and t508, and client 110A receives the corresponding messages.

However, AP 110F broadcasts a group key update message at t510, the earlier periodic series of group key updates being reset at t510. Client 110A is, however, in the power-OFF state at t510, and misses the message broadcast at t510. Client expects to receive a group key update message at t511, but does not receive one at t511 due to the group key update period having been reset. Hence, at or slightly after t511, client 110A transitions to the UNKNOWN state.

Thus, in the UNKNOWN state starting at t511, client 110A wakes-up every beacon frame period and receives a group key update message at t512, thus obtaining the (new) base of the group key update messages. Client 110A transitions to the LEARN state at or immediately after t512.

In the LEARN state, client 110A continues to wake-up to receive every beacon frame, thereby also receiving the three group key update messages at t513, t514 and t515. Client 110A (re-)computes period (P) of the group key update messages, and transitions to the KNOWN state at or immediately after t515. In the KNOWN state, again client 110A increases the length of the listen interval to reduce power consumption, and wakes-up only once (t516 is shown in FIG. 5) every four beacon frame periods. In addition, client 110A wakes up to receive group key update messages (t517 is shown in FIG. 5) based on the base and the period P of the group key update messages. The wake-up duration may also 'encompass' the corresponding group key update message transmission durations, i.e., client 110A may wake up slightly earlier than the start of the corresponding beacon frame (or at least the group key message in the beacon frame), and power-OFF after the end of the beacon frame. Thus, in steady-state, wake-up durations of client 110A are aligned to both the listen period as well as the group key update period.

Although, not illustrated in FIG. 5, client 110A may transition from/to the corresponding one of the three states based on the corresponding events as described above with reference to FIG. 5.

Client 110A designed to operate as described in detail above may provide the benefits of relatively low power consumption, while still being able to receive most group key update messages (or in general, control messages). In the event of non-receipt of an 'expected' control message due to asynchronous events or reset of the control message periodic series (e.g., as a t511 in FIG. 5), client 110A is designed to automatically re-align its wake-up durations so as to be able to be in the power-ON state to receive future control message updates. Thus, the need for buffering of such messages in AP 110A may be reduced, as also the probability of being disconnected or dissociated with BSS 110 due to non-acknowledgement of control messages. Each of the other clients 110B-110E may also be implemented similar to client 110A, and thereby provide similar benefits.

The details of a client 110A, in an embodiment, are described next.

5. Wireless Station

Figure 6:
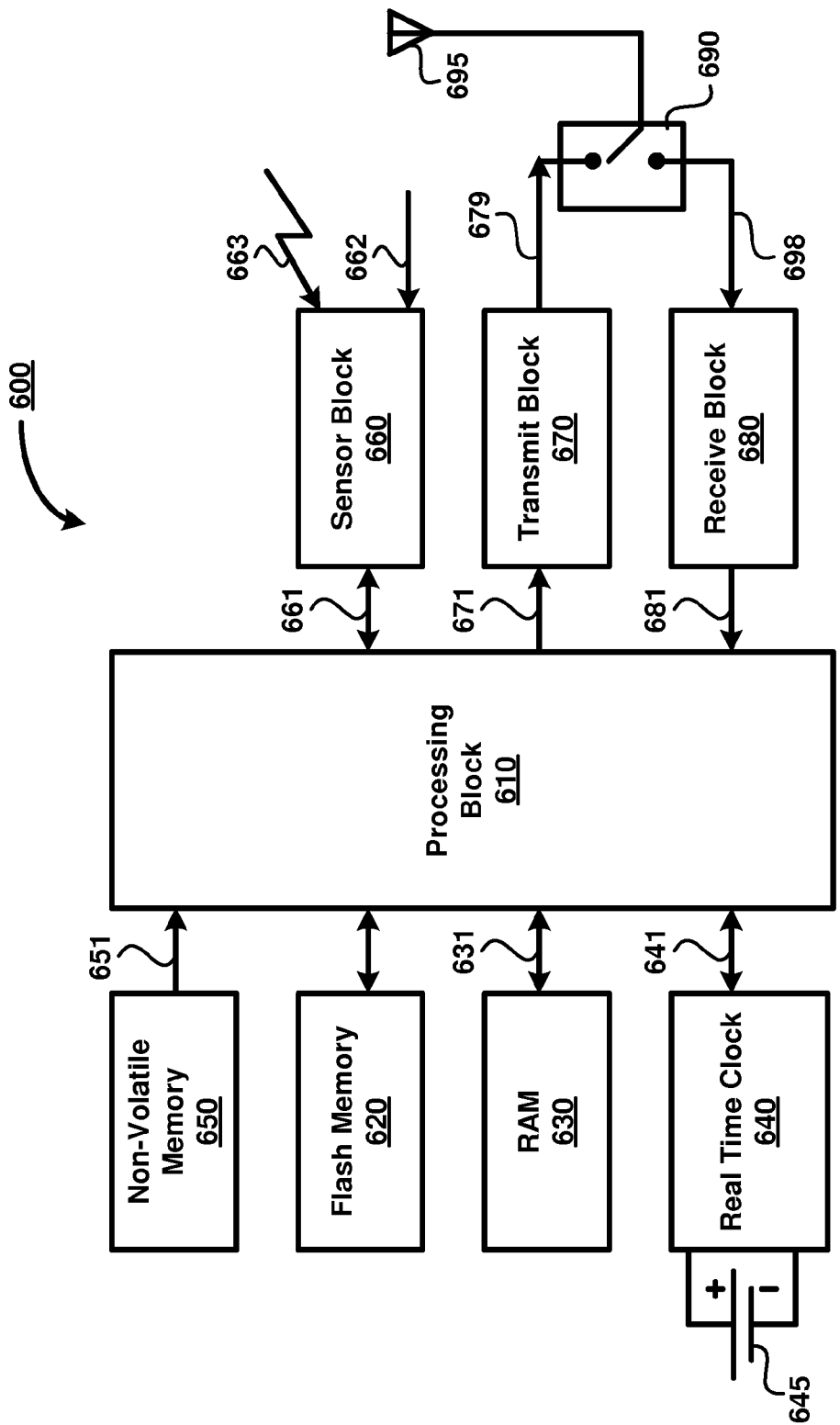
FIG. 6 is a block diagram of the internal details of a wireless station in an embodiment.

FIG. 6 is a block diagram of the internal details of a wireless station in an embodiment. Wireless station 600 may correspond to clients 110A-110E, and with corresponding modifications to AP 110F. Wireless station 600 is shown containing processing block 610, flash memory 620, random access memory (RAM) 630, real-time clock (RTC) 640, battery 645, non-volatile memory 650, sensor block 660, transmit block 670, receive block 680, switch 690 and antenna 695. The whole of wireless station 600 may be implemented as a system-on-chip (SoC), except for battery 645. Alternatively, the blocks of FIG. 6 may be implemented on separate integrated circuits (IC).

Again, the components/blocks of sensor device 600 are shown merely by way of illustration. However, wireless station 600 may contain more or fewer components/blocks. Further, although not shown in FIG. 6, all blocks of wireless station 600 may be connected automatically to an auxiliary power source (such as battery 645) in the event of failure of main power source (not shown).

Sensor block 660 may contain one or more sensors, as well as corresponding signal conditioning circuitry, and provides on path 661 measurements/values of physical quantities such as temperature, pressure, etc., sensed via wired path 662 or wireless path 663.

Antenna 695 operates to receive from and transmit to a wireless medium, corresponding wireless signals containing data. Switch 690 may be controlled by processing block 610 (connection not shown) to connect antenna 695 either to receive block 680 via path 698, or to transmit block 670 via path 679, depending on whether wireless station 600 is to receive or transmit.

Transmit block 670 receives data to be transmitted on path 671 from processing block 610, generates a modulated radio frequency (RF) signal according to IEEE 802.11 standards, and transmits the RF signal via switch 690 and antenna 695. Receive block 680 receives an RF signal bearing data via switch 690 and antenna 695, demodulates the RF signal, and provides the extracted data to processing block 610 on path 681.

RTC 640 operates as a clock, and provides the 'current' time to processing block 610 on path 641. RTC 640 may be backed-up by battery 645 (in addition to the normal source of power, not shown in the Figure). RTC 640 may also contain memory to store critical information received from processing block 610. Although not shown as such in FIG. 6, battery 645 may also be used as back-up power to one or more of the other components/blocks of station 600. Thus, for example, the power supply to flash memory 620 may be automatically switched (by corresponding circuitry not shown) to battery 645 in case of failure of the main power source (not shown).

Flash memory 620 represents an example memory, which contains memory locations organized as blocks. A block represents a set of memory locations (typically contiguous in terms of memory address), which are to be all erased before data can be rewritten into any location. Flash memory 620 may be used to store data obtained from sensor block 660 via processing block 610.

Non-volatile memory 650 is a non-transitory machine readable medium, and stores instructions, which when executed by processing block 610, causes wireless station 600 to provide several desired features. For example, in the context of wireless sensor networks used for building or plant automation, processing block 610 may process and transmit measurement data such as temperature, pressure etc., obtained from sensor block 660. In addition, the instructions may be designed to enable wireless client to operate consistent with the description provided above with respect to client 110A. Thus, the instructions enable wireless station 600 to align its wake-up durations with control messages and thus to receive most of such control messages. Further, the instructions enable wireless station to 600 to be set in power-ON and power-OFF (or at least standby mode). In some embodiment, flash memory 620 may store the instructions for processing block 610.

Processing block 610 (or processor in general) may contain multiple processing units internally, with each processing unit potentially being designed for a specific task. Alternatively, processing block 610 may contain only a single general-purpose processing unit.

RAM 630 and non-volatile memory 650 (which may be implemented in the form of read-only memory/ROM) constitute computer program products or machine (or computer) readable medium, which are means for providing instructions to processing block 610. Thus, such medium can be in the form of removable (floppy, CDs, tape, etc.) or non-removable (hard drive, etc.) medium. Processing block 610 may retrieve the instructions (via corresponding paths 651 and 631), and execute the instructions to provide several features of the present invention (related to management of configuration data), as described below. It should be appreciated that the processors can retrieve the instructions from any randomly accessible storage units (e.g., RAM 630 or flash memory 620) and execute the instructions to provide the features described above.

The instructions thus executed by processing block 610, enable client 110A (or wireless station 600 in general) to receive control messages according to several aspects of the present invention.

6. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of receiving control messages from an access point, said access point being designed to transmit control messages periodically to wireless clients on a Wireless Local Area Network (WLAN), said method being performed in a wireless client, said method comprising:

determining, in said wireless client, an interval between successive ones of a sequence of control messages transmitted by said access point on a wireless medium, wherein said interval is determined based on monitoring said wireless medium for said sequence of control messages;

computing, in said wireless client, at least some future time instances at which said access point is expected to start transmissions of corresponding control messages, wherein said wireless client computes said future time instances based on said interval between successive ones of said monitored sequence of control messages;

operating in a power-save mode in which said wireless client is in a power-ON state in some intervals and in a power-OFF state in other intervals, wherein said wireless client is enabled to receive said control messages only in said power-ON state, but not said power-OFF state; and ensuring that said wireless client is in said power-ON state in corresponding time intervals encompassing start and end of each transmission at said at least some future time instances, said wireless client thereby enabled to receive said control messages.

2. The method of claim 1, wherein said access point and said wireless client are designed to operate according to IEEE 802.11 standards, wherein each of said corresponding control messages sent by said access point specifies an updated value of a decryption key that is to be used by each wireless client of said WLAN for decrypting encrypted messages received from said access point.

3. The method of claim 2, wherein said determining and said computing together comprises:

periodically powering-ON said wireless client till at least two updates of said decryption key are received in said wireless client;

calculating a decryption-key-update period based on said at least two updates; and determining said at least some future time instances based on said decryption-key-update period as well as the time instance at which one of said at least two updates occurred.

4. The method of claim 2, wherein said determining further comprises:

maintaining said wireless client in a power-ON state till at least two updates of said decryption key are received in said wireless client;

calculating a decryption-key-update period based on said at least two updates; and determining said at least some future time instances based on said decryption-key-update period as well as the time instance at which one of said at least two updates occurred.

5. The method of claim 3, wherein said calculating calculates multiple estimates of said decryption-key-update period, each of said multiple estimates corresponding to a corresponding update in said at least two updates, wherein, if at least a threshold number of estimates in said multiple estimates are not all equal, said periodically powering-ON and said calculating are repeated till said at least a threshold number of estimates in said multiple estimates are all calculated to be equal.

6. The method of claim 3, wherein said periodically powering-ON has a power-ON period that is a multiple of the beacon frame period, said beacon frame period being the period of beacon frame transmissions by said access point.

7. The method of claim 6, wherein said power-ON period is progressively increased with respect to time during said computing.

8. The method of claim 5, wherein said periodically powering-ON, said calculating and said determining are repeated if said wireless client is de-authenticated from said wireless network.

9. A non-transitory machine readable medium storing one or more sequences of instructions in a wireless client, wherein execution of said one or more sequences of instructions by one or more processors contained in said wireless client causes said wireless client to perform the actions of:
 determining an interval between successive ones of a sequence of control messages transmitted by an access point on a wireless medium, said access point being designed to transmit control messages periodically to wireless clients on a Wireless Local Area Network (WLAN) wherein said interval is determined based on monitoring said WLAN for said sequence of control messages;
 computing at least some future time instances at which said access point is expected to start transmissions of corresponding control messages, wherein said wireless client computes said future time instances based on an interval between successive ones of said monitored sequence of control messages;
 operating in a power-save mode in which said wireless client is in a power-ON state in some intervals and in a power-OFF state in other intervals, wherein said wireless client is enabled to receive said control messages only in said power-ON state, but not said power-OFF state; and
 ensuring that said wireless client is in said power-ON state in corresponding time intervals encompassing start and end of each transmission at said at least some future time instances, said wireless client thereby enabled to receive said control messages.

10. The machine readable medium of claim 9, wherein said access point and said wireless client are designed to operate according to IEEE 802.11 standards, wherein each of said corresponding control messages sent by said access point specifies an updated value of a decryption key that is to be used by each wireless client of said WLAN for decrypting encrypted messages received from said access point.

11. The machine readable medium of claim 10, wherein said determining and said computing together comprises:
 periodically powering-ON said wireless client till at least two updates of said decryption key are received in said wireless client;
 calculating a decryption-key-update period based on said at least two updates; and
 determining said at least some future time instances based on said decryption-key-update period as well as the time instance at which one of said at least two updates occurred.

12. The machine readable medium of claim 10, wherein said determining further comprises:
 maintaining said wireless client in a power-ON state till at least two updates of said decryption key are received in said wireless client;
 calculating a decryption-key-update period based on said at least two updates; and
 determining said at least some future time instances based on said decryption-key-update period as well as the time instance at which one of said at least two updates occurred.

13. The machine readable medium of claim 11, wherein said calculating calculates multiple estimates of said decryption-key-update period, each of said multiple estimates corresponding to a corresponding update in said at least two updates,
 wherein, if at least a threshold number of estimates in said multiple estimates are not all equal, said periodically powering-ON and said calculating are repeated till said at least a threshold number of estimates in said multiple estimates are all calculated to be equal.

14. The machine readable medium of claim 11, wherein said periodically powering-ON has a power-ON period that is a multiple of the beacon frame period, said beacon frame period being the period of beacon frame transmissions by said access point.

15. The machine readable medium of claim 14, wherein said power-ON period is progressively increased with respect to time during said computing.

16. The machine readable medium of claim 13, wherein said periodically powering-ON, said calculating and said determining are repeated if wireless client is de-authenticated from said wireless network.

17. A wireless client comprising:
 a processor;
 an antenna;
 a transmit block to receive data values from said processor and to generate corresponding modulated radio frequency (RF) signals for transmission, on a wireless medium, via said antenna;
 a receive block to receive, on said wireless medium, RF signals bearing data via said antenna, and to extract said data by demodulating said RF signals, said receive block to provide said data to said processor,
 wherein said processor is operable to:
  determine an interval between successive ones of a sequence of control messages transmitted by an access point on a wireless medium, said access point being designed to transmit control messages periodically to wireless clients on a Wireless Local Area Network (WLAN) wherein said interval is determined based on monitoring said WLAN for said sequence of control messages;
  compute at least some future time instances at which said access point is expected to start transmissions of corresponding control messages, wherein said wireless client computes said future time instances based on an interval between successive ones of said monitored sequence of control messages;
  operate said wireless client in a power-save mode in which said wireless client is in a power-ON state in some intervals and in a power-OFF state in other intervals, wherein said wireless client is enabled to receive said control messages only in said power-ON state, but not said power-OFF state; and
  ensure that said wireless client is in said power-ON state in corresponding time intervals encompassing start and end of each transmission at said at least some future time instances, thereby enabling said wireless client to receive at least some of said control messages.

18. The wireless client of claim 17, wherein said access point and said wireless client are designed to operate according to IEEE 802.11 standards, wherein each of said corresponding control messages sent by said access point specifies an updated value of a decryption key that is to be used by each wireless client of said WLAN for decrypting encrypted messages exchanged received from said access point.

* * * * *